United States Patent
Kapinos et al.

(10) Patent No.: US 10,684,978 B2
(45) Date of Patent: Jun. 16, 2020

(54) PROXIMITY BASED REMOVAL WARNING FOR CONNECTABLE DEVICES

(71) Applicant: Lenovo (Singapore) Pte. Ltd., Singapore (SG)

(72) Inventors: Robert James Kapinos, Durham, NC (US); Russell Speight VanBlon, Raleigh, NC (US); Scott Wentao Li, Cary, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/217,097

(22) Filed: Jul. 22, 2016

(65) Prior Publication Data
US 2018/0024956 A1    Jan. 25, 2018

(51) Int. Cl.
| G06F 13/40 | (2006.01) |
| G06F 13/38 | (2006.01) |
| G08B 6/00 | (2006.01) |
| G08B 3/10 | (2006.01) |

(52) U.S. Cl.
CPC ........ *G06F 13/4081* (2013.01); *G06F 13/385* (2013.01); *G08B 3/10* (2013.01); *G08B 6/00* (2013.01)

(58) Field of Classification Search
CPC .. G06F 13/102; G06F 13/4282; G06F 13/385; G06F 13/4081; G06F 21/44; G06F 13/364; H04W 76/02; H05K 1/115
See application file for complete search history.

(56) References Cited

U.S. PATENT DOCUMENTS

| 6,002,427 | A | * | 12/1999 | Kipust | G06F 21/552 |
| | | | | | 340/571 |
| 6,163,144 | A | * | 12/2000 | Steber | G01R 19/15 |
| | | | | | 324/133 |
| 2014/0218199 | A1 | * | 8/2014 | Cepulis | H04L 41/24 |
| | | | | | 340/635 |
| 2016/0352580 | A1 | * | 12/2016 | McFarland | G06F 16/9024 |
| 2016/0378971 | A1 | * | 12/2016 | Dunstan | G06F 21/44 |
| | | | | | 726/17 |
| 2017/0218199 | A1 | * | 8/2017 | Chaplin | C08L 69/00 |
| 2017/0265234 | A1 | * | 9/2017 | Wallington | H04W 76/14 |
| 2017/0265322 | A1 | * | 9/2017 | Son | H01R 12/712 |
| 2017/0286349 | A1 | * | 10/2017 | Edirisooriya | G06F 13/4282 |

* cited by examiner

*Primary Examiner* — Mirza F Alam
(74) *Attorney, Agent, or Firm* — Ference & Associates LLC

(57) ABSTRACT

One embodiment provides a device, including: a memory that stores data; an indicator element; a proximity sensor; and a processor that is operatively coupled to the memory, and the indicator element, the processor: responding, in connected state, to an indication by the proximity element with an output to the indicator element. Other aspects are described and claimed.

18 Claims, 3 Drawing Sheets

PROXIMITY BASED REMOVAL WARNING FOR CONNECTABLE DEVICES

BACKGROUND

Connectable devices such as pluggable data storage devices or memory sticks are connected to other devices for use. For example, a plugged data storage device such as a USB memory stick may be inserted or plugged into a USB port of another device such as a laptop computer, desktop computer, etc.

If the connectable device is removed unexpectedly, e.g., prior to finishing a save operation of data communicated by another device, there may be unintended consequences such as data loss from the connectable device's memory. Many connectable devices therefore implement some indication, e.g., a busy light, which attempts to indicate to or notify the user that the device is busy and should not be physically removed from the data port or disconnected from the other device.

BRIEF SUMMARY

In summary, one aspect provides a device, comprising: a memory that stores data; an indicator element; a proximity sensor; and a processor that is operatively coupled to the memory, and the indicator element, the processor: responding, in a connected state, to an indication by the proximity element with an output to the indicator element.

Another aspect provides a host device, comprising: a connection element that couples to a storage device; a memory that stores data; and a processor that is operatively coupled to the connection element and the memory, the processor: responding, in a connected state, to an indication by a proximity element with an output to indicate that the storage device should not be uncoupled from the host device.

A further aspect provides a method, comprising: detecting, with a connectable device, a connected state; said connected state comprising an operative connection between the connectable device and another device; sensing, with a proximity sensor of the connectable device, proximity of an object in the connected state; and outputting, to an indicator element of the connectable device, an indication.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While conventionally an indication such as a busy light might be employed by a connectable device to indicate that it is not ready to be physically removed from another device, the light(s) may not be visible to the user or may be misinterpreted by the user.

Accordingly, an embodiment provides a connectable storage device with a proximity sensor and an indicator element, e.g., a sound or haptic element, that is used as a notification or warning element. In an embodiment, the proximity sensor, which may implement capacitive or inductive proximity sensing, detects that the user is in proximity to or contacting the connectable storage device, e.g., touching it. If the device is busy, e.g., communicating data with another device such as a laptop computer, following such proximity detection, the device may indicate, e.g., sound an audible alarm, vibrate, or both, to notify the user that the device should not be disconnected or physically unplugged from the other device. In an embodiment, a variety of sounds, vibrations, or other outputs may be utilized as the indication, e.g., a recorded audio message.

The illustrated example embodiments will be best understood by reference to the figures. The following description is intended only by way of example, and simply illustrates certain example embodiments.

Figure 1:
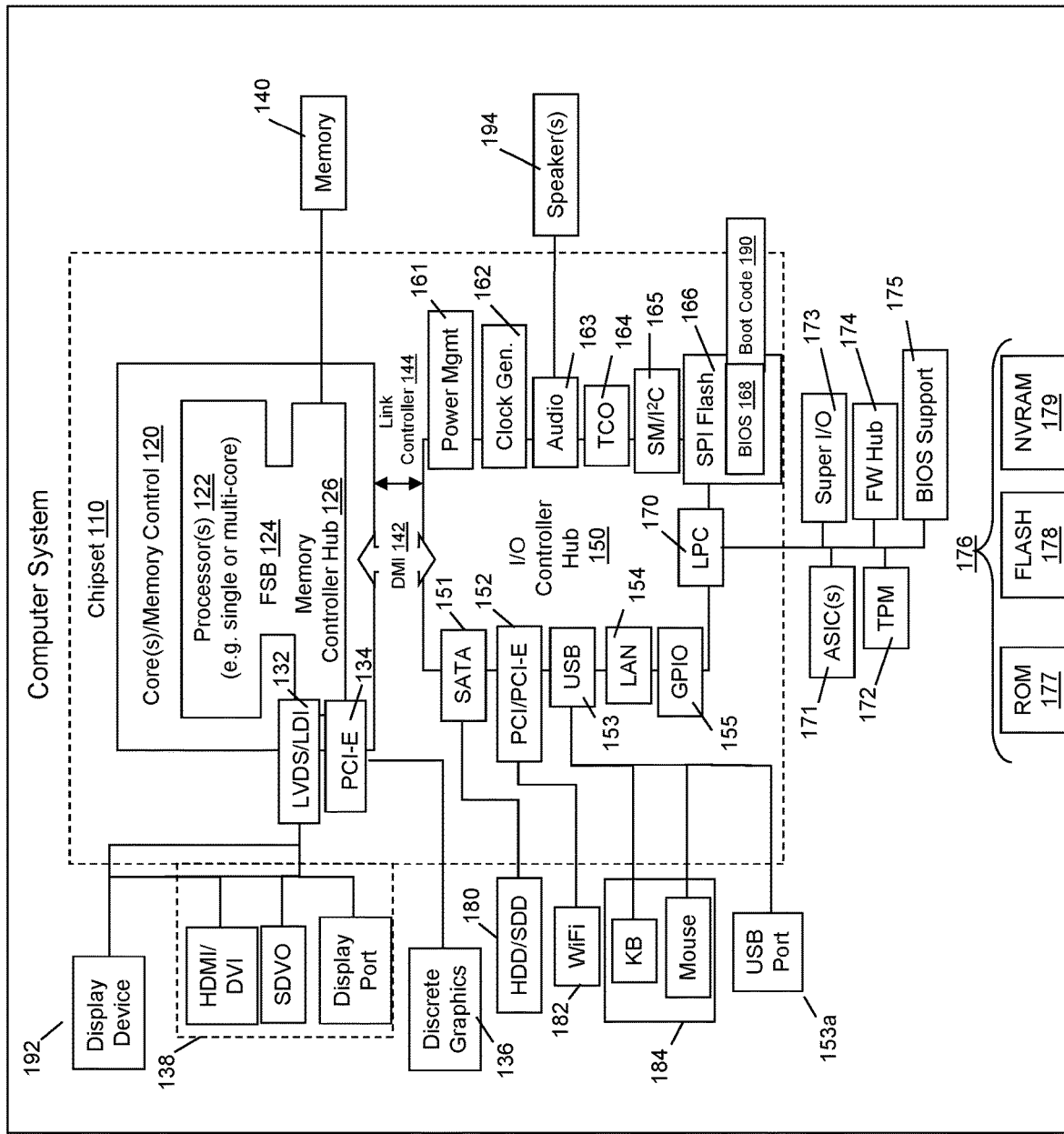
FIG. 1 illustrates an example of information handling device circuitry.

While various other circuits, circuitry or components may be utilized in information handling devices, FIG. 1 depicts a block diagram of an example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 242 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, biometric data capture device, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support. USB interface 153 may include a physical port 153a, e.g., into which a connectable or pluggable storage device is placed.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling device circuitry, as for example outlined in FIG. 1, may be used in devices such as personal computer devices generally, e.g., a laptop or desktop computer. These devices include port(s) or other interfaces to which a connectable or pluggable device is operatively connected.

Figure 2:
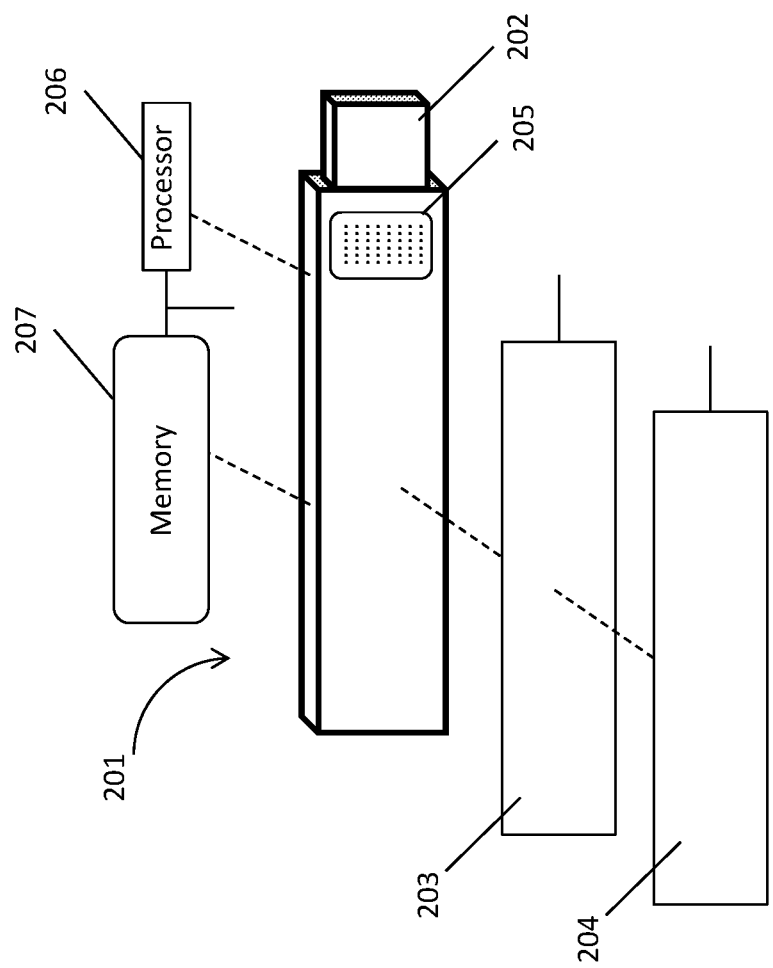
FIG. 2 illustrates an exploded view of an example connectable device.

Referring now to FIG. 2, a connectable or pluggable device 201 may be provided in the form of a memory stick, as illustrated. The device 201 includes a connection element 202, e.g., a part that is plugged into a port of another device. For example, device 201 may include a connection element 202 that is standardized, e.g., a USB plug, which couples to a USB port, e.g., USB port 153a.

The device 201 may communicate data between itself and another device, e.g., laptop computer, using pins provided in the connection element 202 and corresponding pins or contacts in the port, e.g., USB port 153a. This permits a processor 206 of the device 201 to communicate data between memory 207 and another device.

As described herein, device 201 determines if it is in a connected state. For example, device 201 may determine that it has data cashed in volatile memory but not committed to non-volatile storage in memory 207. As such, removal may cause data loss, as device 201 may not have an internal power source. As another example, device 201 may be instructed, e.g., by another device to which it is connected, that it is in a connected or busy state, e.g., because the other device has additional data to send to device 201 for storage in memory 207.

If the device 201 is in the connected or busy state, i.e., not ready for physical removal, processor 206 or other circuit (e.g., a programmable circuit, not separately illustrated) may determine if an object, e.g., a user's finger or hand, is proximate to the device 201. In an embodiment, the sensing may be performed by a proximity sensor provided in the form of a conductive or inductive layer 204 provided in or on the device's 201 exterior.

In the connected or busy state, device 201 may respond to a signal (or lack thereof) from proximity sensing layer 204 by outputting a signal to an indicator element(s) 203 or 205, e.g., provided in the form of a haptic layer 203 disposed in or on the device's 201 exterior and/or in the form of a speaker 205. For example, if proximity sensing layer 204 detects contact or hovering of an object that changes the conductive or inductive characteristic of the proximity sensing layer 204, in the connected or busy state, a dedicated circuit or processor 206 may operate the indicator element(s) 203 or 205 to provide haptic and/or audible feedback.

Figure 3:
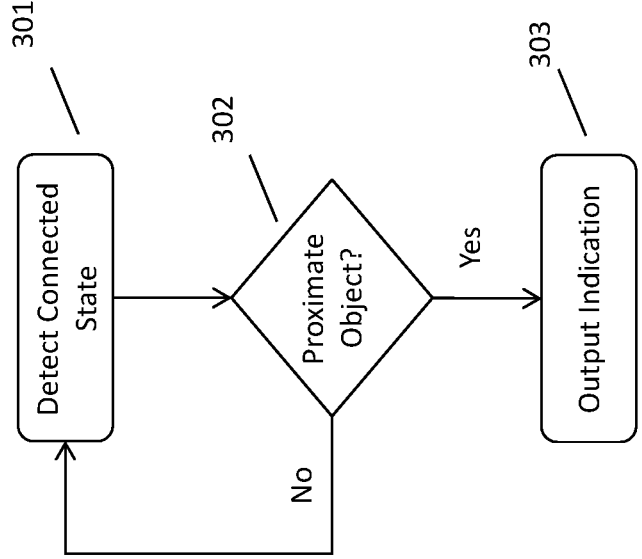
FIG. 3 illustrates an example method of proximity based removal waring for connectable devices.

Referring now to FIG. 3, an example method of providing an indication or warning for a connectable device is illustrated. At 301 a detection of a connected state is made. The detection made at 301 may simply be that the connectable device is physically plugged into a port of another device. However, in an embodiment, the detection made at 301 is that the connectable device is operatively connected to another device, i.e., is capable of transmitting or receiving data or is in a busy state, i.e., is actively transmitting or receiving data from another device, is in the process of storing data received from another device in non-volatile memory, etc. Such a detection may be made by a dedicated circuit included in the connectable device or may be included in a check program executed by a processor or circuit of the device used for native functions.

Detection is made at 301 the connectable device should not be disconnected or physically unplugged from the other device until the connectable device reaches a state at which it is ready for removal. As such, an embodiment detects, e.g., using proximity sensing layer 204, if there is an object, e.g., a user's hand, proximate to the device. If so, the processor or circuit of the connectable device is programmed to operate an indicator element, e.g., haptic layer 203 and/or speaker 205. For example, a haptic pulse may be delivered via haptic layer 203 until the signal from the proximity sensing layer ceases. As another example, a tone or a pre-recorded audio message may be played via speaker 205 to warn the user that the device is busy.

In an embodiment, the proximity element or sensor, as well as the indicator, may be located on another device, e.g., a host device to which the connectable or pluggable device is coupled to or plugged in to. As such, a host device may respond to a signal from the proximity element (of the connectable or pluggable storage device or located elsewhere, e.g., a camera of the host device) with an indication that the connectable of pluggable storage device should not be removed, where the indication may be provided by an indicator element of the connectable or pluggable storage device and/or an indicator element of the host device, e.g., a displayed indicator.

Accordingly, an embodiment provides a connectable or pluggable device that has built in intelligence for indicating or warning a user not to remove it. In an embodiment this is implemented by providing haptic or audible feedback in response to proximity detection in a connected or busy state. As such, the user will be aware that the device is in a state that counsels against removal.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, wherein the device comprises a pluggable storage device pluggable into a host device and, comprising:
   a memory that stores data;
   an indicator element, wherein the indicator element is located on the pluggable device and provides at least a haptic feedback to a user;
   a proximity sensor, wherein the proximity sensor is located on the pluggable device and determines a physical location of the user in relation to the pluggable device; and
   a processor that is operatively coupled to the memory, the proximity sensor, and the indicator element, the processor:
   responding, at the indicator element and while the pluggable device is in a connected state and plugged into the host device and accessible for data transfer between the pluggable device and the host device, to an indication by the proximity sensor with an output to the indicator element, wherein the indication by the proximity sensor is responsive to detection of proximity of a touch of the user to the pluggable device, the output to the indicator element notifying the user that the pluggable device is in the connected state and accessible for data transfer between the pluggable device and the host device.

2. The device of claim 1, wherein the indicator element further includes a second indicator element selected from the group consisting of an indicator element that produces a visible indicator and an audio element that produces sound.

3. The device of claim 2, wherein the audio element outputs predetermined audio as the output.

4. The device of claim 2, wherein the predetermined audio comprises a recorded message.

5. The device of claim 1, wherein the proximity sensor is selected from the group consisting of an inductive proximity sensor and a capacitive proximity sensor.

6. The device of claim 1, wherein the proximity sensor is disposed on an outer surface of the device.

7. The device of claim 1, wherein the proximity sensor is a contact sensor.

8. The device of claim 1, wherein the connected state is a busy state.

9. The device of claim 1, wherein the busy state is selected from the group consisting of a reading state and a writing state.

10. A host device, comprising:
a connection element that couples to a storage device, wherein the storage device comprises a pluggable storage device pluggable into the host device and;
a memory that stores data; and
a processor that is operatively coupled to the connection element and the memory, the processor:
responding, at an indicator element and while the pluggable storage device is in a connected state and plugged into the host device and accessible for data transfer between the pluggable device and the host device, to an indication by a proximity sensor with an output to indicate that the pluggable storage device should not be uncoupled from the host device, the output to the indicator element notifying a user that the pluggable device is in the connected state and accessible for data transfer between the pluggable device and the host device, wherein the indication by the proximity sensor is responsive to detection of proximity of a touch of the user to the device, wherein the indicator element is located on the pluggable storage device and provides at least a haptic feedback to the user, wherein the proximity sensor is located on the pluggable storage device and determines a physical location of the user in relation to the pluggable storage device.

11. A method, comprising:
detecting, with a connectable device, a connected state of the connectable device wherein the connectable device comprises a pluggable storage device pluggable into a host device and; said connected state comprising an operative connection between the connectable device and the host device;
sensing, with a proximity sensor located on the connectable device, proximity of a touch of a user while the connectable device is in the connected state and plugged into the host device and accessible for data transfer between the connectable device and the host device, wherein the proximity sensor determines a physical location of the user in relation to the connectable device; and
responsive to sensing the user is proximity to the connectable device, outputting, to an indicator element of the connectable device, an indication, wherein the indicator element is located on the connectable device and provides at least a haptic feedback to the user, the output to the indicator element notifying the user that the pluggable device is in the connected state and accessible for data transfer between the pluggable device and the host device.

12. The method of claim 11, wherein the outputting further includes a second indicator element comprises producing an output selected from the group consisting of a visible indicator and an audible sound.

13. The method of claim 12, wherein the outputting comprises outputting a predetermined audible sound.

14. The method of claim 12, wherein the predetermined audible sound comprises a recorded message.

15. The method of claim 11, wherein the sensing comprises sensing object contact.

16. The method of claim 11, wherein the sensing comprises sensing object proximity to an outer surface of the connectable device.

17. The method of claim 11, wherein the connected state is a busy state.

18. The method of claim 17, wherein the busy state is selected from the group consisting of a reading state and a writing state.

\* \* \* \* \*